(12) United States Patent
Macy et al.

(10) Patent No.: US 8,838,474 B2
(45) Date of Patent: Sep. 16, 2014

(54) SYSTEM UPDATE MANAGEMENT

(75) Inventors: Barbara R. Macy, Charlotte, NC (US);
David D. Price, Richland, WA (US);
Jerry B. Blow, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 1020 days.

(21) Appl. No.: 12/430,756

(22) Filed: Apr. 27, 2009

(65) Prior Publication Data

US 2010/0191623 A1   Jul. 29, 2010

Related U.S. Application Data

(60) Provisional application No. 61/147,360, filed on Jan. 26, 2009.

(51) Int. Cl.
| | | |
|---|---|---|
| G06Q 30/00 | (2012.01) | |
| G06Q 40/00 | (2012.01) | |
| G06G 7/00 | (2006.01) | |
| G06Q 30/02 | (2012.01) | |
| G06N 3/08 | (2006.01) | |

(52) U.S. Cl.
CPC ............ G06Q 30/0248 (2013.01); G06Q 40/00 (2013.01); G06N 3/08 (2013.01)
USPC .............................. 705/14.47; 705/35; 706/18

(58) Field of Classification Search
None
See application file for complete search history.

(56) References Cited

U.S. PATENT DOCUMENTS

| | | | |
|---|---|---|---|
| 7,117,172 B1 | 10/2006 | Black | |
| 2003/0105721 A1 | 6/2003 | Ginter et al. | |
| 2003/0233319 A1 | 12/2003 | Lawrence | |
| 2004/0098339 A1* | 5/2004 | Malek et al. | ..................... 705/44 |
| 2006/0293981 A1 | 12/2006 | McNelley et al. | |
| 2007/0165019 A1* | 7/2007 | Hale et al. | ..................... 345/418 |
| 2007/0220604 A1 | 9/2007 | Long | |
| 2008/0040275 A1 | 2/2008 | Paulsen et al. | |
| 2008/0114670 A1 | 5/2008 | Friesen | |
| 2008/0195463 A1 | 8/2008 | Aggour et al. | |
| 2009/0144070 A1* | 6/2009 | Psota et al. | ........................ 705/1 |
| 2009/0195463 A1 | 8/2009 | Kim et al. | |

OTHER PUBLICATIONS

International Search Report and the Written Opinion of the International Searching Authority mailed Mar. 8, 2010 for International Application No. PCT/US 10/22038.

(Continued)

*Primary Examiner* — F. Zeender
*Assistant Examiner* — Denisse Ortiz Roman
(74) *Attorney, Agent, or Firm* — Michael A. Springs; Moore and Van Allen, PLLC; Patrick B. Horne

(57) ABSTRACT

Embodiments of the invention provide systems and methods for managing updates to a financial transaction monitoring system, wherein the financial transaction monitoring system is configured to specially handle any financial transactions involving an entity identified in a list of entities. In one embodiment, the system includes a communication interface configured to receive an update to the list of entities, the update including one or more new keywords. The system may further include a memory device having information about a plurality of transactions. In one embodiment, the system includes a processor configured to: determine the number of transactions in the plurality of transactions that can properly be associated with at least one of the new keywords; and determine whether the update will impact the financial transaction monitoring system based at least partially on process metrics and the determined number of transactions in the plurality of transactions that can properly be associated with at least one of the new keywords.

22 Claims, 4 Drawing Sheets

(56) References Cited

OTHER PUBLICATIONS

International Search Report and the Written Opinion of the International Searching Authority mailed May 3, 2010 for International Application No. PCT/US2010/0022040.

International Preliminary Report on Patentability for PCT/US2010/022038, dated Aug. 4, 2011.
International Preliminary Report on Patentability for PCT/US2010/022040, dated Aug. 4, 2011.

* cited by examiner

SYSTEM UPDATE MANAGEMENT

CROSS REFERENCE TO RELATED APPLICATIONS

This application claims benefit of priority under 35 U.S.C. §119(e) to the filing date of U.S. Provisional Application No. 61/147,360, as filed on Jan. 26, 2009, which is incorporated herein by reference in its entirety.

FIELD

In general, the invention relates to systems, methods, and computer program products for updating computer-based systems that rely on dynamic inputs. More particularly, embodiments of the invention provide systems, methods, and computer program products configured to use artificial intelligence to manage updates to a financial transaction monitoring system configured to combat money laundering and/or other fraudulent or problematic transactions.

BACKGROUND

In an effort to combat terrorism, money laundering, and other illegal or problematic activities, governments and other rule-making organizations have promulgated regulations and guidelines to detect financial transactions and assets used for illegal activities or by persons, governments, or organizations engaged in illegal activity or activity adverse to the rule-making organization.

For example, in the United States, the United States Department of the Treasury has formed the Office of Foreign Assets Control ("OFAC") to administer and enforce economic and trade sanctions based on United States foreign policy and national security goals against targeted foreign countries and regimes, terrorists, international narcotics traffickers, those engaged in activities related to the proliferation of weapons of mass destruction, and other threats to the national security, foreign policy, or economy of the United States. To accomplish this goal, OFAC routinely publishes a list of names or other keywords that represent the names of known or suspected terrorist organizations, criminal parties, institutions associated with adverse countries or regimes, or other entities. To comply with OFAC regulations, financial institutions processing financial transactions must identify, block, reject, hold, or otherwise specially handle any transaction involving an entity on the OFAC list. Failure to comply with OFAC regulations can result in significant monetary fines or other penalties.

Other agencies within the United States and other countries also publish lists of entities and similarly require that financial institutions identify and block, reject, hold, or otherwise specially handle transactions involving listed entities. Compliance with these numerous and constantly-changing regulations can be difficult for the financial institution, which may process millions of transactions every day, and requires a significant allocation of resources. This is especially true since many of the keywords published by OFAC and other rule-making organizations include common names or words used in many permissible transactions. As a result, a financial institution must look closely at each transaction containing a keyword to determine whether it is, in fact, a problematic transaction and not merely a "false positive."

Currently, financial institutions rely on large teams of individuals to review each of the many transactions identified each day as containing a keyword. Sporadic spikes and lulls in the number of transactions that contain a keyword result in periods where the team's resources are stretched thin, mixed with periods where the team's resources are under-utilized. Having a large team dedicated to the task of looking for problematic transactions also raises other issues, such as: (1) security of the information handled by the team; (2) background checks and security clearances required for each member of the team; (3) extensive training and monitoring of new members of the team; (4) loss of valuable experience each time a team member leaves the team; and (5) compliance failures caused by inconsistencies and fatigue. What is needed is an improved system for monitoring financial transactions. It would be advantageous if such a system would use less resources and, at the same time, provide improved accuracy, speed, and security.

BRIEF SUMMARY

In general, embodiments of the present invention include apparatuses/systems, methods, and computer program products that use artificial intelligence to identify problematic transactions and help manage other resources involved in the transaction monitoring process. For example, in one embodiment, a financial institution, such as a bank, has a division responsible for making sure the financial institution is in constant compliance with the rules and regulations issued by OFAC and/or other rule-making organizations. This division monitors the constantly-changing lists of sanctioned entities published by OFAC and/or other rule-making organizations and compiles these lists into a list of keywords that the financial institution should look for when processing transactions. The keywords are then provided to the financial institution's transaction monitoring system and stored in a memory.

Throughout the course of business, the financial institution constantly receives information about numerous financial transactions, such as payments, to be processed by the financial institution. Each transaction may include information about the transaction such as information about one or more parties involved in the transaction (e.g., parties receiving payment, parties providing payment, parties receiving goods, parties providing goods, banks receiving funds, banks providing funds, intermediary banks, regulatory agencies, websites, etc.), the location of these parties, account numbers, vessels or other systems used to transport assets, and the like. The financial institution uses a computerized apparatus to quickly review each transaction and the information available about the transaction for the presence of any words matching the keywords stored in the transaction monitoring system's memory. Transactions that are not associated with the keywords are processed by the financial institution in the normal course. However, any transaction identified by the computerized apparatus as containing a keyword is then forwarded to a computerized artificial intelligence apparatus for further review.

The artificial intelligence apparatus looks at the keywords and other information about the transaction and, using artificial intelligence algorithms, determines whether the transaction is a problematic transaction that must be blocked, held, or otherwise specially processed or, instead, is merely an acceptable transaction that was a false positive and can therefore be processed by the financial institution in the normal fashion. For example, in one embodiment, the artificial intelligence apparatus looks at information about a transaction, such as the keywords identified in the transaction information, the location of the keywords (e.g., in the description of the goods, in the party names, in the names of intermediary financial institutions, in the addresses of the parties, in the account number, or in other identifiable and distinguishable fields in the transaction information), the number of keywords, the combinations of keywords if more than one keyword is found in a single transaction, other words in the transaction information, the amount of money involved in the transaction, the type of transaction, the type of goods or other assets involved in the transaction, and the like, and compares this information to pre-programmed and learned rules and relationships generated from the past experiences of the artificial intelligence apparatus and/or human reviewers. Various artificial intelligence algorithms known in the art can be used and adapted for this application, such as neural network algorithms, statistical classification algorithms, machine learning algorithms, Bayesian network algorithms, swarm intelligence algorithms, logic algorithms, and/or combinations of the foregoing algorithms.

Transactions that are identified by the artificial intelligence apparatus as acceptable transactions, despite the presence of one or more keywords, are released by the artificial intelligence apparatus and forwarded to the transaction processing system for normal processing. In one embodiment, one or more human verifiers randomly check a small percentage of these released transactions to confirm that the artificial intelligence apparatus is functioning properly. If the human verifiers identify errors or concerns with the released transactions, the human verifiers can provide feedback regarding the specific concerns and transactions to the artificial intelligence apparatus so that the artificial intelligence apparatus can use the feedback to learn from any mistakes.

Transactions that are identified by the artificial intelligence apparatus as problematic transactions are forwarded on to be blocked, rejected, held, or specially processed according to the rules related to the specific keywords identified in the transaction. In one embodiment, the transaction monitoring system provides these transactions to one or more verifier terminals, where one or more human verifiers review some or all of the transactions identified as problematic by the artificial intelligence apparatus.

In some embodiments, the artificial intelligence provides notes, scores, ranks, or other information to the human identifiers to indicate the level of certainty to which the artificial intelligence apparatus concludes that a particular transaction is, in fact, problematic and/or to target the human verifier's attention to certain transaction information tending to show that the transaction is or is not problematic. For example, in one embodiment, the artificial intelligence apparatus divides the transactions that it thinks may be problematic into two categories: a first category for transactions deemed to have a high probability of being problematic, and a second category for transactions deemed to have a lower probability of being problematic. In such an exemplary embodiment, the human verifiers may choose to only conduct a random review of the high-probability transactions, assuming that the un-reviewed high-probability transactions are, in fact, problematic, and then focus most of their efforts on reviewing the lower-probability transactions, since the artificial intelligence algorithm may not have had sufficient information to make an accurate determination of some of the lower-probability transactions.

In one embodiment, the results of the human verifiers' review of the transactions identified by the artificial intelligence apparatus as problematic are fed back to the artificial intelligence apparatus so that the artificial intelligence apparatus can continuously learn from its successes and errors and become increasingly accurate in its determinations.

In some embodiments, the artificial intelligence apparatus or other artificial intelligence systems are used to monitor and/or manage the transaction monitoring process. For example, in one embodiment, a second artificial intelligence apparatus is used to monitor the volume of transactions processed by the human verifiers and the volume of transactions identified as problematic or potentially problematic by the first artificial intelligence algorithm that reviews the transactions. In this way, the second artificial intelligence apparatus can learn the capacity and tolerances of the human verifiers and learn to anticipate overcapacity problems. In one embodiment, when the second artificial intelligence apparatus anticipates an overcapacity potential, it also manages the overcapacity by, for example, displaying an avatar on the screens of one or more verifier terminals and informing the verifier that they must increase the speed of their reviews in order to complete the processing of the transactions within a certain period of time (e.g., by the end of the day). In some embodiments, where the artificial intelligence apparatus determines that the human verifiers, even working at maximum efficiency, will not be able to handle the volume of transactions coming through the system, the artificial intelligence apparatus displays an avatar on the screen of a manager's terminal or otherwise notifies a manager or other personnel or systems that more resources are needed, or that a higher risk of non-compliance may have to be temporarily acceptable in order to process all of the transactions within a specified period of time.

In some embodiments, the first artificial intelligence apparatus is also used to manage configuring the transaction monitoring process to comply with new keywords added to the keyword datastore. For example, in one embodiment of the invention, when new keywords are to be added to the transaction monitoring system's keyword datastore or other changes are to be made to the keyword datastore, the artificial intelligence apparatus reviews the new keywords or the keyword changes against a set of transactions, such as a sample set of past transactions, to determine how many transactions in the dataset will be deemed by it to be problematic or potentially problematic transactions as a result of the new keywords or keyword changes. Based on the dataset and its past learned and pre-programmed experiences, the artificial intelligence apparatus can determine the impact that the new keyword will have on the volume of transactions sent to the human verifiers and thus, the impact on the capacity of the transaction monitoring system using current or assumed resources.

In one embodiment, the artificial intelligence apparatus determines whether one or more new keywords or changes to the keyword datastore will have no impact to capacity, a manageable impact to capacity, or an unmanageable impact to capacity. Where the keywords would have no impact, or a manageable impact, to capacity, the artificial intelligence apparatus adds the new keywords to the keyword datastore. However, where the artificial intelligence apparatus determines that the addition of one or more new keywords to the keyword datastore would have an unmanageable impact to the transaction monitoring system, the artificial intelligence apparatus takes steps to address and/or provide notice of the unmanageable impact. For example, in one embodiment, the artificial intelligence apparatus displays an avatar on the screen of a manager's terminal explaining the situation and requesting that temporary exceptions be allowed for certain keywords, or that additional resources be applied to the transaction monitoring system.

BRIEF DESCRIPTION OF THE DRAWINGS

Having thus summarized an exemplary embodiment of the invention, reference will now be made to the accompanying drawings to describe embodiments of the invention in greater detail, wherein.

DETAILED DESCRIPTION OF EMBODIMENTS OF THE INVENTION

Figure 1:
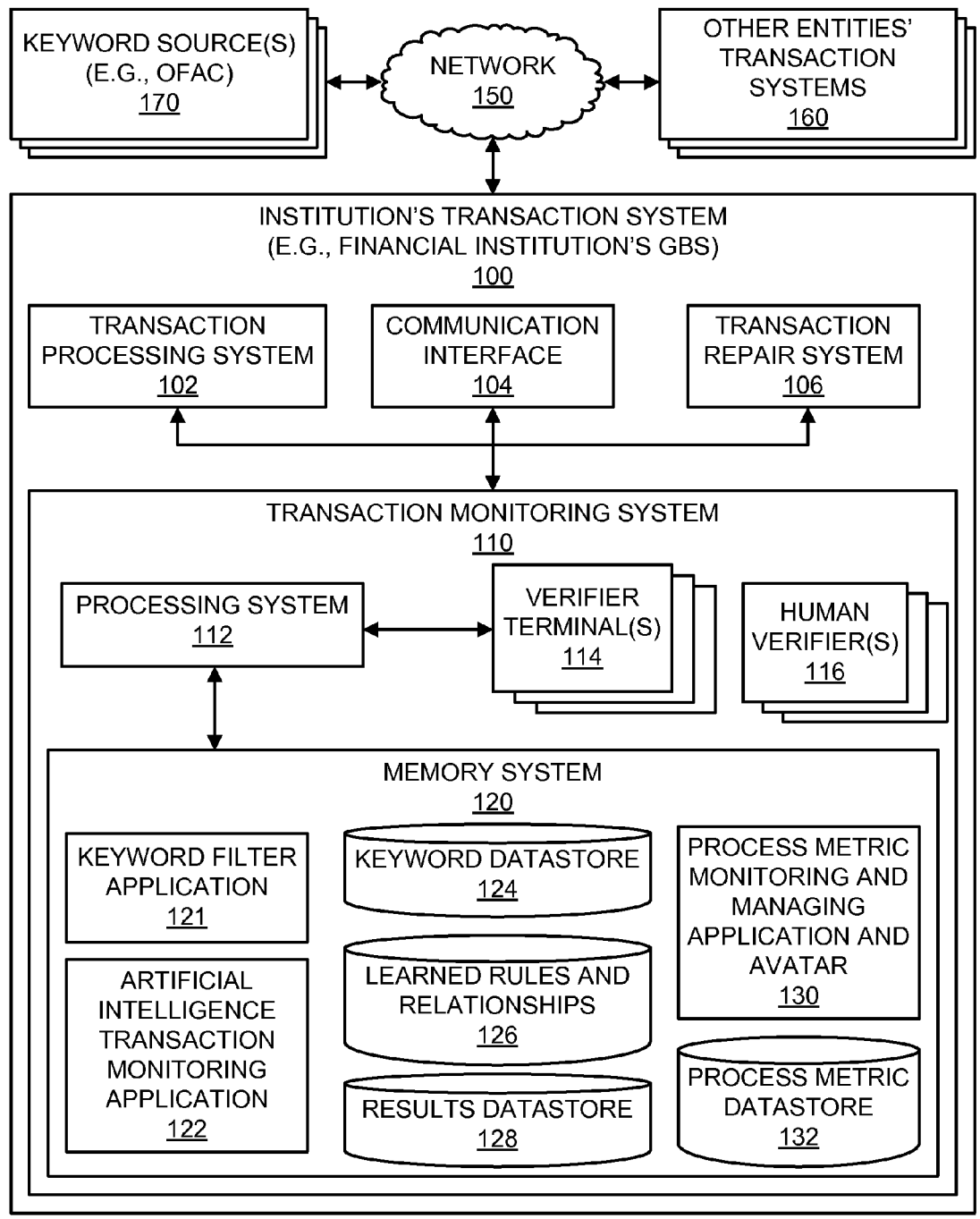
FIG. 1 provides a block diagram of a financial transaction monitoring system, in accordance with one embodiment of the present invention.

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of ordinary skill in the art, the present invention may be embodied as a method, system, computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, or device. More specific examples of the computer-readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. In the context of this document, a computer-readable medium may be any medium that can contain, store, communicate, or transport the program for use by or in connection with the instruction execution system, apparatus, or device.

Computer program code for carrying out operations of embodiments of the present invention may be written in an object-oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatuses (systems), and computer programs products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture, including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

FIG. 1 provides a block diagram of a financial transaction monitoring system 110 and an environment in which the transaction monitoring system resides, in accordance with one embodiment of the present invention. As used herein, a "financial transaction" refers to any transaction having a monetary component. For example, a financial transaction can include, but is not limited to, a transfer of money or other assets, a monetary deposit, a monetary withdrawal, the establishment of a credit, debit, or money market account, the extension of credit or a loan, a payment, an investment, a purchase, and/or the like. Although several embodiments of the invention described herein refer to the monitoring of financial transactions, it will be appreciated that other embodiments of the invention described herein can be used to monitor any other type of transaction.

As used herein, the term "financial institution" refers to an institution that acts as an agent to provide financial services for its clients or members by processing financial transactions for its clients or members. Financial institutions can include, but are not limited to, banks, building societies, credit unions, stock brokerages, asset management firms, savings and loans, money lending companies, insurance brokerages, insurance underwriters, dealers in securities, and similar businesses. Retail, wholesale, and service businesses, as well as manufacturers, may also process transactions as disclosed herein. The terms "financial transaction," "financial institution," "bank," and any similar terms are used herein in their broadest sense and are intended to encompass all such possibilities.

Referring again to FIG. 1, the environment in which embodiments of the present invention exist generally includes an institution's transaction system 100, the transaction systems 160 of one or more other entities, and one or more keyword sources 170. In some embodiments, these systems are communicatively coupled by a communication network 150. In one embodiment, the network 150 includes a direct wireless or wireline connection between the institution's transaction system 100, one or more transaction systems 160 belonging to other entities, and/or one or more keyword source(s) 170. In other embodiments, however, the network 150 includes one or more other devices that relay communications between the systems. The network 150 may include a global area network (GAN), such as the Internet or an intranet, a wide area network (WAN), a local area network (LAN), a wireless network, a wireline network, a virtual private network, and/or the like.

The institution's transaction system 100 is a system configured to process transactions, such as financial transactions, that originate within the institution's transaction system 100 or are received from one or more other transaction systems 160 via, for example, the network 150. For example, in one embodiment, the institution is a financial institution, such as a bank, and the institution's transaction system 100 is the financial institution's Global Banking System (GBS) configured to interact with the transaction systems 160 of other financial institutions to process financial transactions, such as payment transactions. For example, in one exemplary financial transaction, payment instructions are communicated from a first institution's transaction system 160 over the network 150 to the financial institution's GBS 100. The payment instructions instruct, for example, the financial institution's GBS 100 to transfer money from a particular customer's account to a second institution's transaction system 160.

A keyword source 170 is generally a rule-making entity that publishes keywords that indicate certain entities whose financial transactions must be identified and blocked, rejected, held, or otherwise specially processed according to instructions set forth by the rule-making entity. In one embodiment, the keyword source 170 includes a government agency, such as the United States' OFAC, and the keywords include the names of persons, organizations, countries, merchant vessels, businesses, websites, banks, regimes, and/or the like, whose transactions have been restricted or at least flagged by the government agency as the result of a law or policy decision. For example, OFAC periodically publishes a list of individuals and companies owned or controlled by, or acting for or on behalf of, targeted countries. It also lists individuals, groups, and entities, such as terrorists and narcotics traffickers designated under programs that are not country-specific. Collectively, such individuals and companies are called "Specially Designated Nationals" or "SDNs." Their assets are blocked and U.S. persons and businesses are generally prohibited from dealing with them. As a result, in order to comply with U.S. law, financial institutions in the U.S. or dealing with the U.S. dollar must identify any transaction involving one of these SDNs or a sanctioned country and block, reject, hold, or otherwise specially process these transactions and/or notify authorities according to the OFAC's instructions.

In other embodiments, the keyword source 170 includes a similar agency of another country, a private organization, and/or a division of the financial institution itself. For example, in one embodiment of the invention, the keyword source 170 includes a division or agent of the financial institution that gathers and combines the keywords from a number of other sources and provides them to the financial institution's transaction system 100 electronically via the network 150. In such an embodiment, the financial institution's division or agent may create some of its own keywords in response to certain lists, sanctions, advisories, laws, regulations, etc., that it gathers from numerous sources. In some embodiments of the invention, there are a number of different keyword sources 170. It will be understood that keywords need not be "words" at all and can include numeric strings and other characters, symbols, images, and the like that may be included in transaction information. Likewise, a "keyword" may be a single word, a phrase, or a combination of two or more words.

As illustrated in FIG. 1, in one embodiment of the invention, the institution's transaction system 100 generally includes a communication interface 104, a transaction processing system 102, a transaction repair system 106, and a transaction monitoring system 110. Although these systems are illustrated separately in FIG. 1, it is understood that, in some embodiments, the separation is merely conceptual and the systems are combined or partially combined together to share processing, memory, and other hardware and/or software resources.

The communication interface 104 generally includes one or more network interfaces for communicating with one or more devices over network 150. In one embodiment, the communication interface 104 is configured to receive keywords from one or more keyword sources 170. These keywords may be periodically pushed by the keyword sources 170 to the communication interface 104, or pulled by the communication interface 104 from the keyword sources 170. Once the communication interface 104 receives the keywords, the communication interface 104 sends the keywords to the transaction monitoring system 110 where they are stored within a keyword datastore 124 within a memory system 120.

The communication interface 104 is also configured to receive information about transactions, such as payment instructions, from the one or more other transaction systems 160 belonging to other entities. In some embodiments, the communication interface 104 includes a user interface that allows a user to enter information into the transactions systems, such as manually-entered keywords published by the keyword sources 170, or financial transactions originating from within the institution's transaction system 100. In this regard, the communication interface 104 may include one or more terminals having various types of user input and user output devices.

As the communication interface 104 receives transaction information, the communication interface 104 electronically sends the transaction information to the transaction monitoring system 110. The transaction monitoring system 110 reviews each transaction, as described in greater detail below, and determines which transactions are acceptable and can proceed to the transaction processing system 102 to be handled by the institution in the normal fashion, and which transactions are problematic and cannot be handled in the normal fashion, since they involve an entity identified in the keywords. The problematic transactions are then sent to the transaction "repair" system 106 where they are processed according to any special instructions issued by the rule-making organization that originally published the keyword. For example, some problematic transactions will require that certain authorities are notified of the transaction, that the transaction be put on hold, blocked, rejected, or specially processed. In some embodiments, funds requested in a transaction that are blocked or rejected must be placed in an interest-bearing account rather than transferred to the intended recipient, at least until the issue between the entity and the relevant rule-making organization that sanctioned the entity is resolved.

As described in greater detail below, in order to review the transactions and determine whether each transaction is acceptable or problematic, the transaction monitoring system 110 generally includes a processing system 112 operatively coupled to a memory system 120 and one or more verifier terminals 114. In the illustrated embodiment, the memory system 120, which includes one or more types of computer-readable storage medium, generally includes a keyword filter application 121, an artificial intelligence transaction monitoring application 122, a process metric monitoring and managing application and avatar 130, a keyword datastore 124, a learned rules and relationships datastore 126, a results datastore 128, and a process metric datastore 132. In the illustrated embodiment, the transaction monitoring system 110 also includes one or more human verifiers 116 that interact with the transaction monitoring system 110 using the one or more verifier terminals 114.

Figure 2:
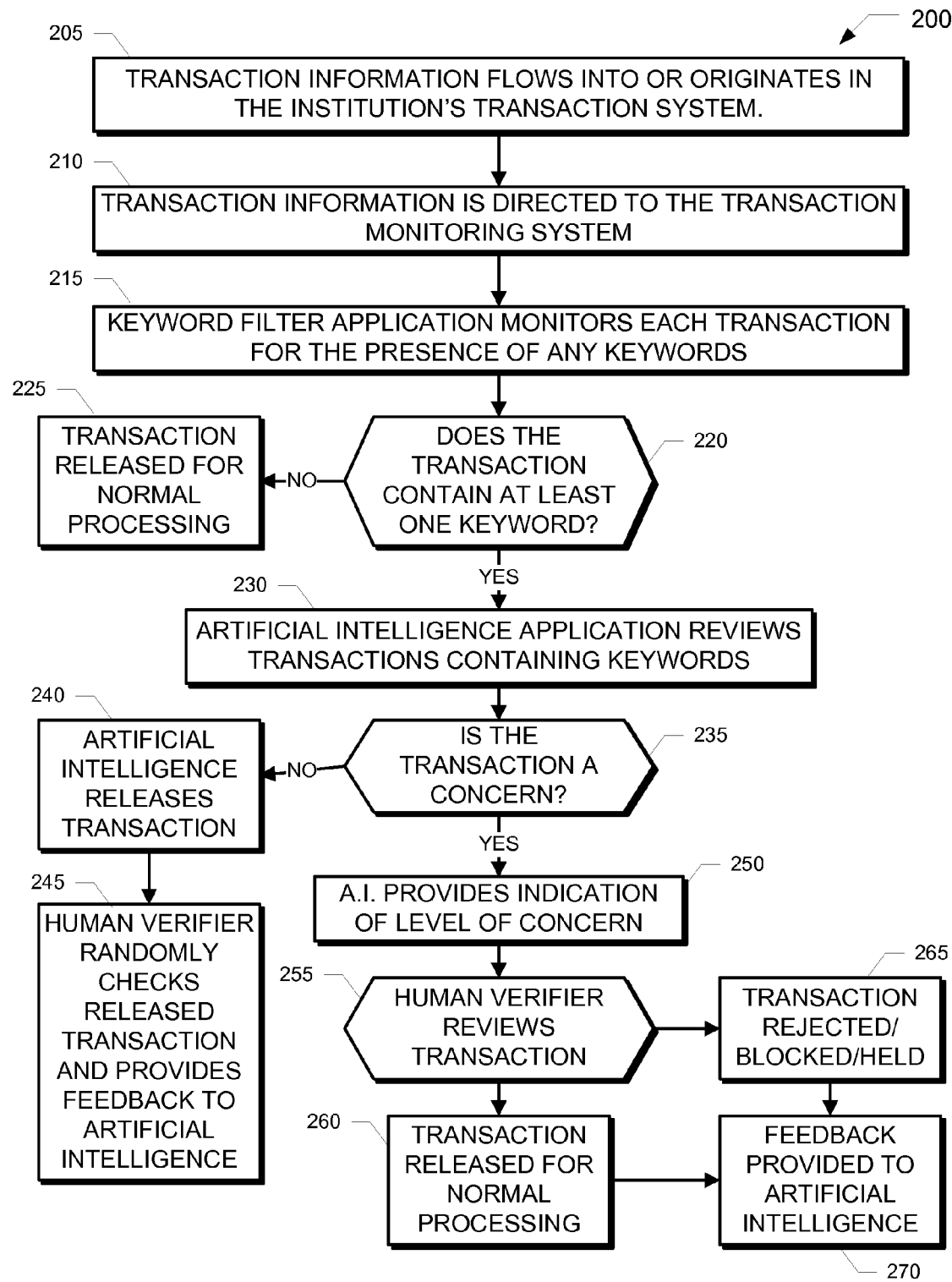
FIG. 2 provides a flow diagram illustrating a process whereby the financial transaction monitoring system monitors financial transactions to locate problematic transactions, in accordance with an embodiment of the present invention.
Figure 3:
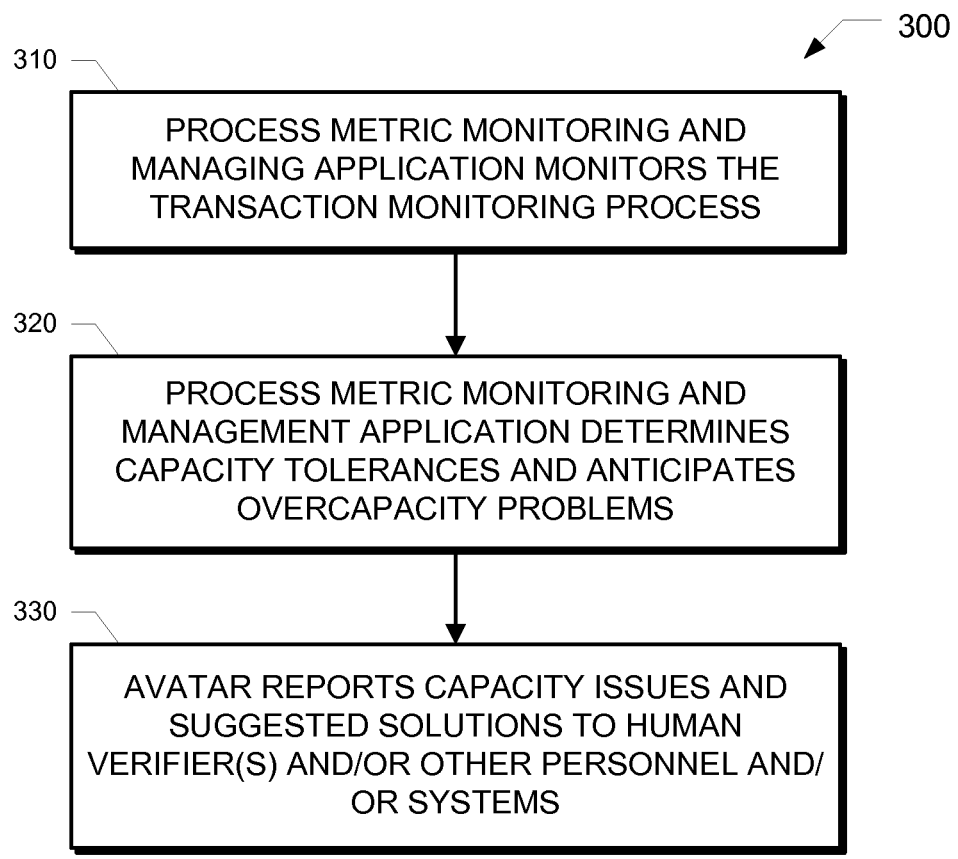
FIG. 3 provides a flow diagram illustrating a process whereby the financial transaction monitoring system monitors and manages process capacity, in accordance with an embodiment of the present invention.
Figure 4:
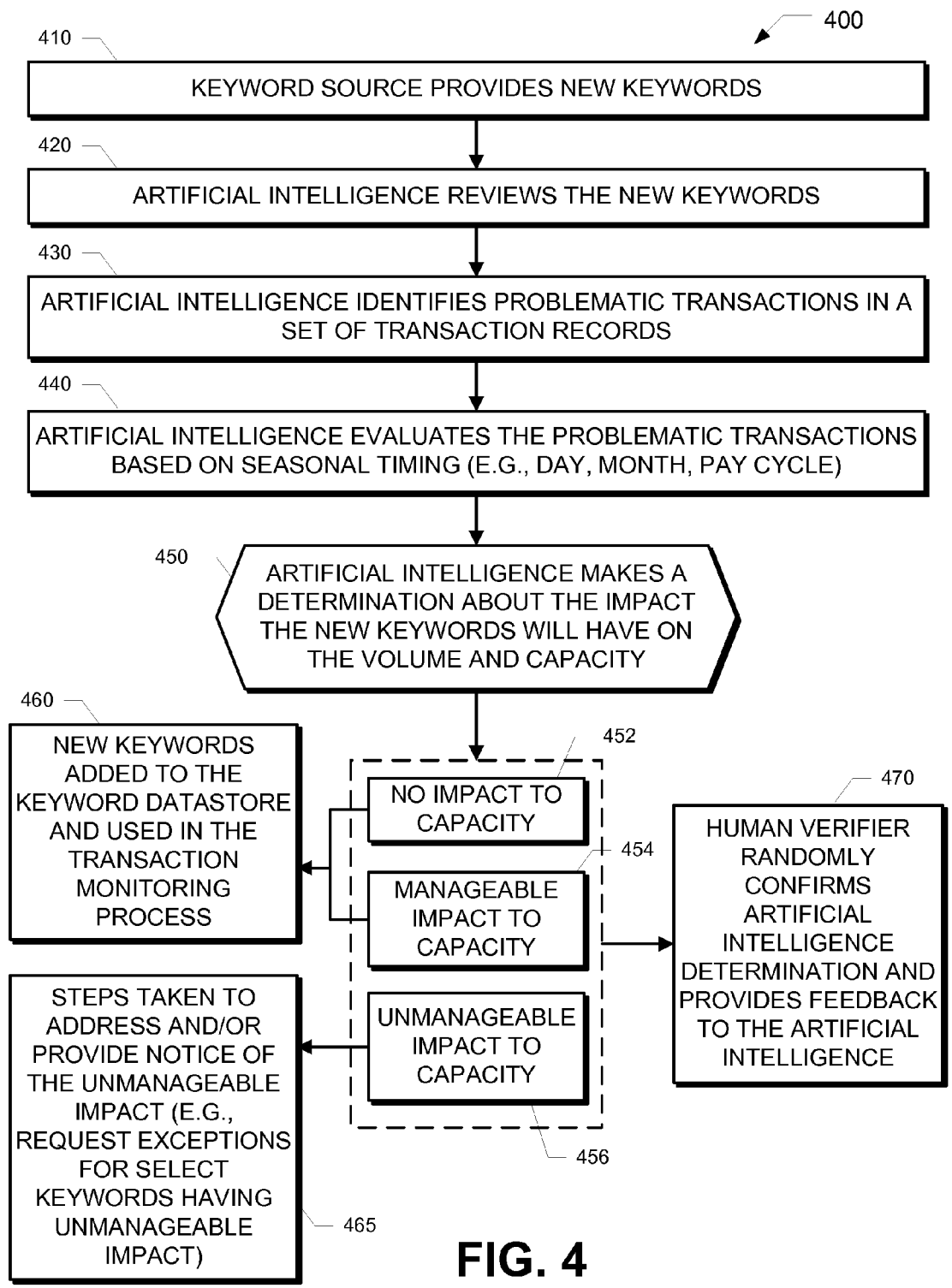
FIG. 4 provides a flow diagram illustrating a process whereby the financial transaction monitoring system manages the introduction of new keywords, in accordance with an embodiment of the present invention.

As used herein, the term "application" generally refers to computer-readable program code comprising computer-readable instructions and stored on a computer-readable storage medium, where the instructions instruct a processor to perform certain functions, such as logic functions, read and write functions, the functions described herein and in FIGS. 2-4, etc. As used herein, "artificial intelligence" generally refers to the capability of a device to perform functions that are normally associated with human intelligence, such as reasoning and optimization through experience. More particularly, artificial intelligence attempts to approximate the results of human reasoning by organizing and manipulating factual and heuristic knowledge. Artificial intelligence algorithms use past data provided to it and its past experiences and feedback to generate rules and identify relationships between data that enable the system to receive new data that it has not seen before and make reasoned decisions regarding that data and how it should be handled. For example, artificial intelligence algorithms known in the art that may be used and adapted for the applications described herein can include, but are not limited to, neural network algorithms, statistical classification algorithms, machine learning algorithms, Bayesian network algorithms, swarm intelligence algorithms, logic and fuzzy logic algorithms, iterative learning algorithms, evolutionary computation algorithms, genetic algorithms, and/or combinations of the foregoing algorithms.

Referring now to FIG. 2, FIG. 2 provides a flow diagram illustrating a process 200 whereby the financial transaction monitoring system 110 monitors financial transactions to locate problematic transactions, in accordance with an embodiment of the present invention. As represented by block 205, transaction information about one or more transactions flows into or originates in the institution's transaction system 100. As described above, transaction information may be entered by user input devices of the communication interface 104, or received by the communication interface 104 from another entity's transaction system 160 located on the network 150.

As represented by block 210, the transaction information for each received transaction is then directed to the transaction monitoring system 110 so that the transaction can be reviewed to determine if it needs to be blocked, held, or otherwise specially processed pursuant to a directive from a rule-making organization. In the illustrated embodiment, the transaction monitoring system 110 begins its review by using a keyword filter application 121 to determine which transactions are associated with information having one or more keywords contained therein, as represented by block 215. In general, the keyword filter application 121 includes computer-readable instructions for instructing the processing system 112 to compare words or other characters in the transaction information with words or other characters stored in the keyword datastore 124.

As represented by the decision diamond 220, the keyword filter application 121 determines, for each transaction, whether the transaction contains at least one keyword associated with it. As represented by block 225, if the keyword filter application 121 determines that a transaction does not contain any keywords, then the transaction is released to the transaction processing system 102 for normal processing of the transaction. As represented by block 230, if the keyword filter application 121 determines that a transaction does contain at least one keyword, then the keyword filter application 121 places the transaction in a queue of transactions for the artificial intelligence transaction monitoring application 122 to review in more detail.

As described above, the artificial intelligence transaction monitoring application 122 generally includes a plurality of computer-readable instructions stored in the memory system 120 that are configured to instruct the processing system 112 to use one or more artificial intelligence algorithms in combination with past known data, experiences, and feedback to develop one or more learned rules and relationships 126, store these learned rules and relationships 126 in the memory system 120, and use these learned rules and relationships 126 and algorithms to make reasoned decisions about a transaction based on the transaction's associated information.

For example, in one embodiment, a results datastore 128 stores information about numerous past transactions along with the ultimate determination about whether each of the past transactions was problematic or acceptable. These results 128 may include results determined by humans, results determined by the artificial intelligence application 122 and confirmed by humans, and/or results determined by the artificial intelligence application 122 and not reviewed by humans. It may be preferable in some embodiments, to have a certain mass of results in the results datastore 128 that have been closely reviewed or confirmed by humans so that the artificial intelligence application 122 has some factual basis for the rules and relationships 126 that it generates. Using the results datastore 128, the artificial intelligence application 122 identifies, over time, relationships between the transaction information of acceptable transactions and between the transaction information of problematic transactions. As represented by decision diamond 235, the artificial intelligence application 122 then determines, based on its programmed instructions, keyword matches, and these learned rules and relationships 126, whether the transaction is a concern.

For example, the artificial intelligence application 122 can look for relationships in the number of keyword matches in a transaction, combinations of different keywords in a transaction, the location of keywords in the transaction information (e.g., whether the keyword is in a party name field, an intermediary bank field, a description of the transaction field, a receiving party field, a sending party field, an invoice, a description of goods field, an address field, an originating bank field, an issuing bank field, etc.), other non-keywords in the transaction or combinations of non-keywords with other non-keywords or keywords, the monetary amount involved, the type of assets involved, the type of transaction, and/or the like. The artificial intelligence application 122 can then use these relationships that it identifies to later determine if a transaction never seen before by the artificial intelligence application 122 is problematic or acceptable.

For example, supposing that the keyword "MARIA" is a keyword because it is an acronym for a bank that is known to be run by the Cuban government, Cuba currently being a sanctioned country in the United States. Since "MARIA" is a common name in many areas of the world, the word will show up in the transaction information of many transactions. As a result, the keyword filter application 121 will identify all of the transactions containing the term "MARIA" and direct them to the artificial intelligence application 122 for further review. Over time, the artificial intelligence application 122 will learn from human-determined or confirmed results of transactions containing the term "MARIA", and discover relationships between those transactions that are determined to be acceptable and those determined to be problematic. For example, the artificial intelligence application 122 may determine that most problematic transactions involving the term "MARIA" contain the term "MARIA" in a particular field of transaction information, or in combination with one or more other keywords or non-keywords. If the artificial intelligence application 122 then encounters a new transaction having the term "MARIA" in this particular field of transaction information or in combination with the same one or more other words, then the artificial intelligence application 122 would be more likely to find the new transaction problematic. In another example, the artificial intelligence application 122 may learn that transactions where "MARIA" is in a "party name" field and is closely preceded or followed by the last name "VELLUCCI," the transactions are all acceptable transactions. In this way, the transaction monitoring system 110 is constantly learning, adjusting, and making reasoned decisions regarding whether a transaction containing a keyword is likely or unlikely to be a problematic transaction that should be held, rejected, blocked, further reviewed by a human verifier, or otherwise specially-processed by the transaction system 100.

Referring again to FIG. 2, as represented by block 240, if the artificial intelligence application determines that the transaction is not a concern (i.e., it was a "false positive," meaning that it contained a keyword but is deemed acceptable and not a significant risk of non-compliance with the rule-making organization's directives), the artificial intelligence application releases the transaction to the transaction processing system 102 for normal processing. As represented by block 245, in one embodiment, a human verifier 116 uses a verifier terminal 114 to randomly check a percentage, generally a small percentage, of the released transactions and provide feedback to the artificial intelligence application 122 based on the results of each check. For example, in one embodiment, the results of each check by a human verifier 116 is stored in the results datastore 128. In this way, the artificial intelligence application 122 can continue to learn from its correct and any incorrect determinations.

As represented by block 250, in one embodiment, if the artificial intelligence application 122 determines that the transaction is a concern, the artificial intelligence application 122 also provides an indication of the level of concern or, in other words, the likelihood that the transaction is, in fact, problematic. For example, the artificial intelligence application 122 may rank, score, group, or otherwise distinguish between transactions it deems to be potentially problematic. For example, in one embodiment, the artificial intelligence application 122 divides the transactions that it thinks may be problematic into two categories: a high probability that it is problematic, and a lower probability that it is problematic. In such an exemplary embodiment, the human verifiers 116 may choose to only conduct a random review of the high-probability transactions, assuming that the un-reviewed high-probability transactions are, in fact, problematic, and then focus most of their efforts on reviewing the lower-probability transactions, since the artificial intelligence algorithm may not have had sufficient information to make an accurate determination of some of the lower-probability transactions.

As represented by decision diamond 255, one or more human verifiers 116 use one or more verifier terminals 114 to review each transaction deemed problematic or potentially problematic by the artificial intelligence application 122. It should be noted that, in some embodiments, there may be little or even no review by human verifiers 116 if the artificial intelligence application 122 is sufficiently advanced and accurate. However, where there is a review by a human verifier 116, one embodiment of the artificial intelligence application directs (e.g., by notes, comments, highlighting, an avatar, or other techniques or providing information to a user at a verifier terminal 114) the human verifier 116 to certain information deemed important to the artificial intelligence application 122 in making a determination about the transaction to aid the human verifier 116 in the review of the transaction.

As represented by block 260, if the human verifier 116 determines that the artificial intelligence application 122 was incorrect and that the transaction is acceptable, the human verifier 116 uses the verifier terminal 114 to release the transaction to the transaction processing system 102 for normal processing. As represented by block 265, if the human verifier 116 determines that the artificial intelligence application 122 was correct and that the transaction is problematic, the human verifier 116 allows the transaction to be blocked, rejected, held, or otherwise specially processed by the transaction "repair" system 106.

As represented by block 270, in either case, feedback about the human verifier's determination and the ultimate classification of the transaction is fed back into the artificial intelligence application 122 so that it can continuously learn from its successes and failures, and thereby become increasingly accurate in its own determinations. In one embodiment, providing feedback to the artificial intelligence application 122 includes storing results of the determination of each transaction into the results datastore 128 that the artificial intelligence application 122 uses to devise rules and relationships 126.

Referring now to FIG. 3, FIG. 3 provides a flow diagram illustrating a process 300 whereby the financial transaction monitoring system 110 monitors and manages process capacity, in accordance with an embodiment of the present invention. As represented by block 310, the process metric monitoring and managing application 130 stored in the transaction monitoring system's memory 120 is configured to monitor the transaction monitoring process by, for example, storing process metrics in a process metric datastore 132. Such process metrics 132 may include, for example, the number of human verifiers 116 and the schedules of the human verifiers 116, the average volume handled by the average human verifier 116 and/or each individual human verifier 116, the average high and low efficiencies of the average human verifier 116 and/or each individual human verifier 116, the number or percentage of transactions identified by the keyword filter application 121 as having a keyword, the number or percentage of transactions identified by the artificial intelligence application 122 as being or potentially being problematic, the number or percentage increase in transactions at various times in the day, month, year, etc.

As represented by block 320, the process metric monitoring and management application 130 includes computer-readable instructions that instruct the processing system 112 to determine capacity tolerances and anticipate overcapacity problems based on the process metrics 132. In one embodiment, the process metric monitoring and management application 130 includes artificial intelligence algorithms for learning relationships between various performance metrics that indicate overcapacity and/or under-capacity situations and possible ways the overcapacity and/or under-capacity situations can be managed.

As represented by block 330, in one embodiment of the present invention the process metric monitoring and managing application 130 displays an avatar on the screen of certain personnel to report capacity issues and suggested solutions. For example, the process metric monitoring and managing application 130 may display an avatar on the screens of the verifier terminals 114 to notify all of the human verifiers 116 of an anticipated increase in the volume of transactions that will need to be reviewed. The avatar may then suggest that each human verifier 116 must increase the speed with which they review transactions by a certain percentage in order for the system to be able to handle the anticipated increase in volume within a certain period of time. In some embodiments, the process metric monitoring and managing application 130 determines, based on past and current information, which human verifiers 116 are already working at or near maximum efficiency and which are not. In such embodiments, the process metric monitoring and managing application 130 may then use the avatar to instruct the particular human verifiers 116 that are not performing at the needed efficiency that they need to increase their efficiency. In other embodiments, the process metric monitoring and managing application 130 may notify managers and/or other systems and/or personnel using an avatar or other notification mechanisms of the anticipated capacity issues and suggest solutions so that action can be taken to increase resources for reviewing transactions, decrease volume through the system, increase a tolerance for a certain level of risk of non-compliance, and/or take other actions to manage the upcoming issues.

Referring now to FIG. 4, FIG. 4 provides a flow diagram illustrating a process 400 whereby the financial transaction monitoring system 110 manages the introduction of new keywords into the financial transaction monitoring system 110, in accordance with an embodiment of the present invention. As illustrated by block 410, a keyword source 170 provides new keywords to the institution's transaction system 100 via, for example, network 150 and/or communication interface 104. As illustrated by block 420, the artificial intelligence application 122 executed by the processing system 112 reviews the new keywords. As illustrated by block 430, the artificial intelligence application 122 identifies the problematic (or potentially problematic) transactions in a set of transaction records (e.g., a sample set of past transaction records), where the identified problematic transactions are deemed problematic by virtue of the addition of the new keywords.

As illustrated by block 440, the artificial intelligence application 122 then evaluates these identified problematic transactions based on seasonal timing (e.g., day, month, pay cycle, etc.) to determine if the problematic transactions occur or occur more frequently on a certain schedule or during known high-volume, low-volume, high-capacity, or low-capacity times for the transaction monitoring system 110. Based on this information, as illustrated by decision diamond 450, the artificial intelligence application 122 then makes a determination about the effect that the new keywords are likely to have on the volume of transactions processed, the capacity of the transaction monitoring system 110, and the overall impact of the new keywords on the transaction monitoring system 110. In one embodiment, the artificial intelligence application 122 uses artificial intelligence algorithms in combination with learned rules and relationships 126, process metric information 132, and the number of new problematic or potentially-problematic transactions resulting from the new keywords to make this determination.

As illustrated by blocks 452, 454, and 456, respectively, one embodiment of the artificial intelligence application 122 determines either that the new keywords will: (1) have no (or at least no noticeable) impact to the capacity of the current system; (2) have only a manageable impact to the capacity of the current system; or (3) have an unmanageable impact to the capacity of the system (i.e., it will put the system in an unmanageable overcapacity situation). As represented by block 460, for keywords that are determined to have no impact to capacity, or only a manageable impact to capacity, the keywords are added by the processing system 112 to the keyword datastore 124 and used in the transaction monitoring process 200 illustrated in FIG. 2. As represented by block 465, if the artificial intelligence application 122 determines that the addition of one or more new keywords will have an unmanageable impact to the capacity of the current transaction monitoring system 110, then steps are taken to address and/or provide notice of the unmanageable impact. For example, in one embodiment, a temporary request for keyword exceptions is made and the appropriate personnel are notified of the anticipated capacity issues, so that the issues can be addressed with an increase in resources, such as human verifiers 116, or other system and/or process changes. In one embodiment, the artificial intelligence application 122 employs an avatar for this purpose and displays the avatar on the screen of an appropriate user terminal to provide notice of the anticipated issues and/or suggested process or system changes to address the anticipated issues.

As represented by block 470, in one embodiment one or more human verifiers 116 use one or more verifier terminals 114 to randomly check the capacity-impact determinations made by the artificial intelligence application 122. The verifier terminals 114 may then be configured to provide feedback to the artificial intelligence application 122 to help the artificial intelligence application 122 learn.

While certain exemplary embodiments have been described and shown in the accompanying drawings, it is to be understood that such embodiments are merely illustrative of and not restrictive on the broad invention, and that this invention may not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An update management system configured to manage updates to a financial transaction monitoring system, wherein the financial transaction monitoring system is configured to specially handle any financial transactions involving an entity identified in a list of entities, and wherein the update management system comprises:

a communication interface configured to receive an update to the list of entities, the update comprising one or more new keywords;

a memory device comprising information about a plurality of transactions; and a processor configured to:

determine, using an artificial intelligence algorithm, the number of transactions in the plurality of transactions that can properly be associated with at least one of the one or more new keywords;

determine, using an artificial intelligence algorithm, whether the update will impact the financial transaction monitoring system based at least partially on one or more process metrics and the determined number of transactions in the plurality of transactions that can properly be associated with at least one of the one or more new keywords; and if the update will result in an overcapacity situation indicating at least a human verifier overcapacity, determine a new keyword from the one or more new keywords that has the greatest impact on the overcapacity situation; and request an exception for the new keyword.

2. The update management system of claim 1, wherein the processor is configured to allow the update to be made if the processor determines that the update will not result in an overcapacity situation indicating at least a human verifier overcapacity.

3. The update management system of claim 1, wherein the plurality of transactions comprises a sample of past financial transactions.

4. The update management system of claim 3, wherein the processor is configured to determine the number of transactions in the plurality of transactions that can properly be associated with at least one of the one or more new keywords by:

using an algorithm to determine how many transactions of the sample of past financial transactions involve an entity identified in the list of entries;

using the algorithm to determine how many transactions of the sample of past financial transactions involve an entity identified in the updated list of entries; and comparing how many transactions of the sample of past financial transactions involve an entity identified in the list of entries with how many transactions of the sample of past financial transactions involve an entity identified in the updated list of entries.

5. The update management system of claim 4, wherein the algorithm comprises an algorithm used by the financial transaction monitoring system to determine whether a financial transaction involves an entity identified in the list of entities.

6. The update management system of claim 1, wherein the one or more process metrics comprise human verifier capacity trends.

7. The update management system of claim 1, wherein the processor is configured to notify a person, entity, or device of an anticipated overcapacity situation or of a task to be completed to address an anticipated overcapacity situation resulting from the update.

8. A method configured to manage updates to a financial transaction monitoring system, wherein the financial transaction monitoring system is configured to specially handle any financial transactions involving an entity identified in a list of entities, and wherein the method comprises:

receiving an update to the list of entities, the update comprising one or more new keywords;

receiving information about a plurality of transactions; and using a processor to:

determine, using an artificial intelligence algorithm, the number of transactions in the plurality of transactions that can properly be associated with at least one of the one or more new keywords;

determine, using an artificial intelligence algorithm, whether the update will impact the financial transaction monitoring system based at least partially on one or more process metrics and the determined number of transactions in the plurality of transactions that can properly be associated with at least one of the one or more new keywords; and if the update will result in an overcapacity situation indicating at least a human verifier overcapacity, determine a new keyword from the one or more new keywords that has the greatest impact on the overcapacity situation; and request an exception for the new keyword.

9. The method of claim 8, further comprising:
allowing the update to be made if the processor determines that the update will not result in an overcapacity situation indicating at least a human verifier overcapacity.

10. The method of claim 8, wherein the plurality of transactions comprises a sample of past financial transactions.

11. The method of claim 10, wherein using the processor to determine the number of transactions in the plurality of transactions that can properly be associated with at least one of the one or more new keywords comprises:

using an artificial intelligence algorithm to determine how many transactions of the sample of past financial transactions involve an entity identified in the list of entries;

using the algorithm to determine how many transactions of the sample of past financial transactions involve an entity identified in the updated list of entries; and comparing how many transactions of the sample of past financial transactions involve an entity identified in the list of entries with how many transactions of the sample of past financial transactions involve an entity identified in the updated list of entries.

12. The method of claim 11, wherein the algorithm comprises an algorithm used by the financial transaction monitoring system to determine whether a financial transaction involves an entity identified in the list of entities.

13. The method of claim 8, wherein the one or more process metrics comprise capacity trends based on system resource trends and financial transaction trends.

14. The method of claim 8, further comprising notifying a person, entity, or device of an anticipated overcapacity situation or of a task to be completed to address an anticipated overcapacity situation with respect to at least human verifier overcapacity resulting from the update.

15. A computer program product for managing updates to a financial transaction monitoring system, wherein the financial transaction monitoring system is configured to specially handle any financial transactions involving an entity identified in a list of entities, the computer program product comprising a non-transitory computer readable medium, having computer-executable program code stored therein, the computer-executable program code comprising:

a first executable code portion configured to receive an update to the list of entities, the update comprising one or more new keywords;

a second executable code portion configured to receive information about a plurality of transactions;

a third executable code portion configured to determine the number of transactions in the plurality of transactions that can properly be associated with at least one of the one or more new keywords;

a fourth executable code portion configured to determine, using an artificial intelligence algorithm, whether the update will impact the financial transaction monitoring system based at least partially on one or more process metrics and the determined number of transactions in the plurality of transactions that can properly be associated with at least one of the one or more new keywords;

a fifth executable code portion configured to determine a new keyword from the one or more new keywords that has the greatest impact on an overcapacity situation with respect to at least human verifier overcapacity; and a sixth executable code portion configured to request an exception for the new keyword.

16. The computer program product of claim 15, further comprising:

an executable code portion configured to allow the update to be made if the processor determines that the update will not result in an overcapacity situation with respect to at least human verifier overcapacity.

17. The computer program product of claim 15, wherein the plurality of transactions comprises a sample of past financial transactions.

18. The computer program product of claim 17, wherein the third executable code portion comprises:

an executable code portion configured to use an algorithm to determine how many transactions of the sample of past financial transactions involve an entity identified in the list of entries;

an executable code portion configured to use the algorithm to determine how many transactions of the sample of past financial transactions involve an entity identified in the updated list of entries; and an executable code portion configured to compare how many transactions of the sample of past financial transactions involve an entity identified in the list of entries with how many transactions of the sample of past financial transactions involve an entity identified in the updated list of entries.

19. The computer program product of claim 18, wherein the algorithm comprises an artificial intelligence algorithm.

20. The computer program product of claim 18, wherein the algorithm comprises an algorithm used by the financial transaction monitoring system to determine whether a financial transaction involves an entity identified in the list of entities.

21. The computer program product of claim 15, wherein the one or more process metrics comprise capacity trends, the capacity trends comprising human verifier capacity trends.

22. The computer program product of claim 15, further comprising:

an executable code portion configured to notify a person, entity, or device of an anticipated overcapacity situation or of a task to be completed to address an anticipated overcapacity situation resulting from the update.

* * * * *